United States Patent [19]
Oguchi et al.

[11] Patent Number: 6,033,242
[45] Date of Patent: Mar. 7, 2000

[54] IC CARD CONNECTOR

[75] Inventors: Wataru Oguchi; Hidetaka Furusho, both of Miyagi-ken, Japan

[73] Assignee: Alps Electric Co., Ltd., Japan

[21] Appl. No.: 09/124,451

[22] Filed: Jul. 29, 1998

[30] Foreign Application Priority Data

Jul. 28, 1997 [JP] Japan ................................. 9-201461

[51] Int. Cl.[7] ........................................................ H01R 13/62
[52] U.S. Cl. ............................................................. 439/159
[58] Field of Search ............................................. 439/159

[56] References Cited

U.S. PATENT DOCUMENTS 5,683,258 11/1997 Takano .................................... 439/159

FOREIGN PATENT DOCUMENTS

09082409  3/1997  Japan .

*Primary Examiner*—Neil Abrams
*Assistant Examiner*—Javaid Nasri
*Attorney, Agent, or Firm*—Brinks Hofer Gilson & Lione

[57] ABSTRACT

Disclosed is an IC card connector in which the amount the IC card is discharged can be increased even if the operating force applied to the push rod is reduced. A first support shaft 15 and a second support shaft 16 protrude from a pin housing 10 which is provided with a large number of pin contacts, and an eject lever 13 is rotatably supported by the first support shaft 15. A push rod 12 is supported so as to be capable of reciprocating by a frame 11 which is formed into an integral unit with the pin housing 10, and the forward end of the push rod 12 is engaged with the eject lever 13. A drive lever 14 having a claw portion 14*b* for pushing out the IC card 1 is rotatably supported by the second support shaft 16. Formed on this drive lever 14 are a first engagement member 14*c* which is farther from the second support shaft 16 and a second engagement member 14*d* which is nearer to the second support shaft 16, these engagement portions 14*c* and 14*d* protruding into joint holes 13*c* and 13*d* formed in the eject lever 13. When the eject lever 13 rotates upon the depressing of the push rod 12, power is transmitted to the drive lever 14 through the first engagement member 14*c* in the initial stage of the rotation, and, halfway through the rotation, the power transmitting section for rotating the lever 14 is changed from the first engagement member 14*c* to the second engagement member 14*d*.

2 Claims, 6 Drawing Sheets

IC CARD CONNECTOR

BACKGROUND OF THE INVENTION

1. Field of the Invention

The present invention relates to an IC card connector which is mounted to an apparatus used by inserting an IC card into it and, in particular, to an improvement of an eject mechanism for separating an IC card inserted in the connector from pin contacts.

2. Description of the Related Art

An IC card connector is usually substantially equipped with a pin header portion in which a large number of pin contacts for connection to socket contacts in the IC card are arranged in a pin housing, a frame for guiding the IC card when it is inserted or extracted, an eject mechanism portion for separating the IC card in the inserted state from the pin contacts, etc. The above-mentioned eject mechanism portion comprises a push rod that is depressed when extracting the IC card, a lever member rotatably supported by the pin housing, etc. When the push rod is depressed with the IC card inserted in the connector, the lever member, which is adapted to rotate upon the depressing of the push rod, pushes out the IC card to a discharge position.

Figure 7:
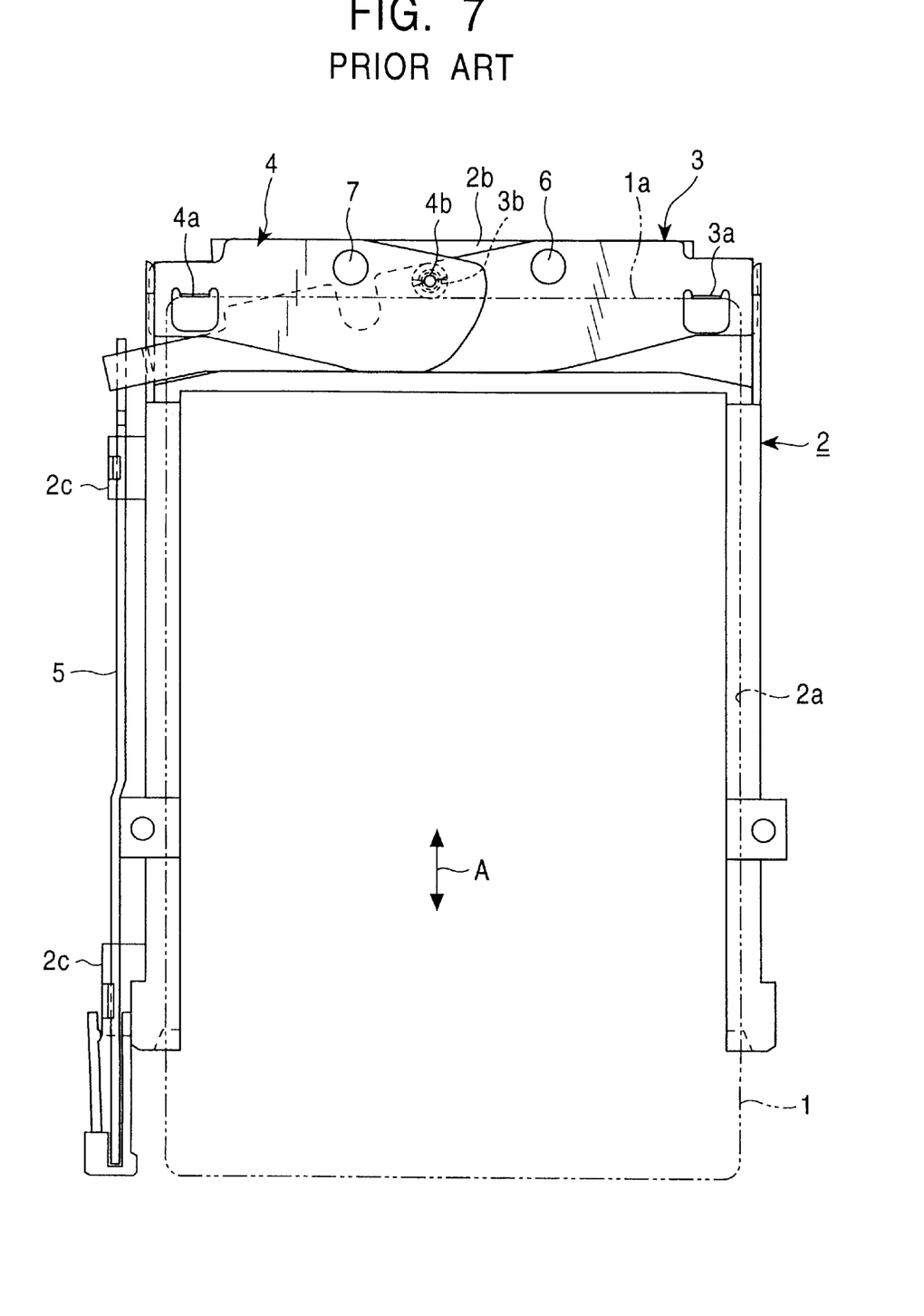
FIG. 7 is a bottom view of a conventional IC card connector with an IC card inserted therein.
Figure 8:
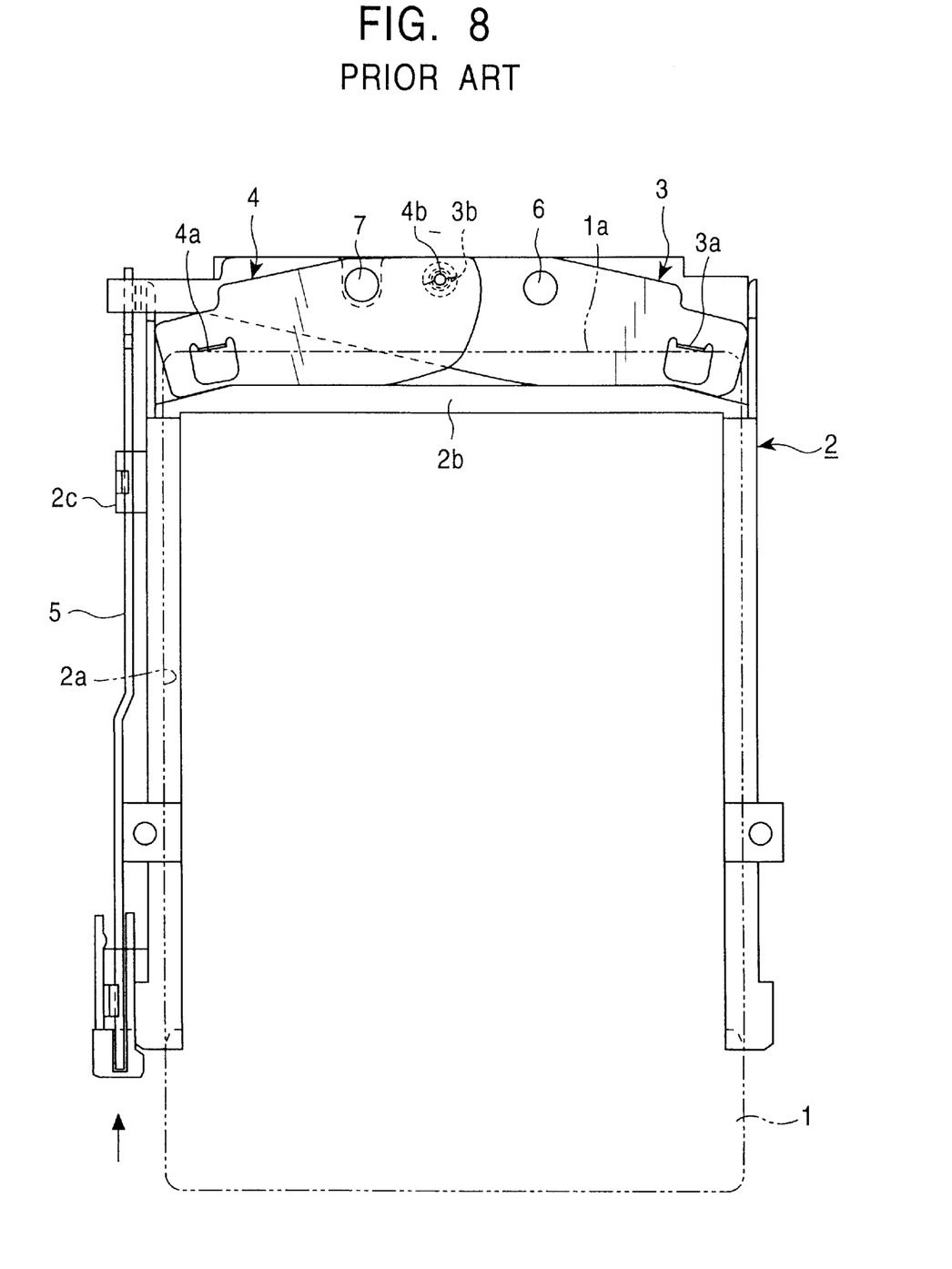
FIG. 8 is a bottom view showing the conventional IC card connector in the ejecting state.

A conventional example of such an IC card connector as disclosed in Japanese Patent Laid-Open No. 9-82409 will be described. FIG. 7 is a bottom view of the conventional IC card connector with an IC card inserted therein, and FIG. 8 is a bottom view of the IC card connector in the eject state.

The IC card connector shown in these drawings mainly comprises a pin header (not shown) formed by forcing in and fastening in a predetermined arrangement a large number of pin contacts for connection to socket contacts in the IC card 1, a frame 2 which has a pair of grooves 2a for guiding the IC card 1 widthwise on either side when the card is inserted or extracted and which has a substantially U-shaped configuration in plan view, an eject lever 3 mounted to this frame 2, a driver lever 4, a push rod 5, etc. A bridge portion 2b of the frame 2 is opposed to the upper surface of the pin housing of the above-mentioned pin header. The eject lever 3 and the drive lever 4 are respectively rotatably supported by a first support shaft 6 and a second support shaft 7 mounted to the bridge portion 2b of the frame 2. The push rod 5, which is depressed when extracting the IC card 1, is held so as to be capable of reciprocating in the IC card inserting/extracting directions (the directions indicated by arrows A of FIG. 7) by support frames 2c protruding from two positions on a side surface of the frame 2. An eject mechanism portion is formed by the eject lever 3, the drive lever 4 and the push rod 5.

The eject lever 3 has in its one end portion a claw portion 3a for pushing out the IC card 1. The other end portion thereof is engaged with the rear end portion of the push rod 5. Somewhere between the two end portions, there is formed a recessed engagement step portion 3b. The drive lever 4 has in its end portion which is nearer to the push rod 5 a claw portion 4a for pushing out the IC card 1; in the other end portion thereof, there is formed a protruding engagement step portion 4b. The eject lever 3 and the drive lever 4 are joined together by slidably fitting together the engagement step portions 3b and 4b; upon the rotation of the eject lever 3, the drive lever 4 rotates in the reverse direction.

In this IC card connector, constructed as described above, as the IC card 1 is inserted from the card inserting portion of the frame 2, the IC card 1, which moves toward the above-mentioned pin header while being guided by the pair of grooves 2a, forces the pin contacts of the pin header into its socket contacts while pushing in the claw portion 3a of the eject lever 3 and the claw portion 4a of the drive lever 4, so that, by inserting the IC card 1 a predetermined distance, an insertion completed state is attained, in which, as shown in FIG. 7, the IC card 1 is reliably connected to each pin contact. At this time, being pushed in by the card inserting/extracting surface 1a of the IC card 1, the eject lever 3 and the rotation lever 4 are rotated around the first support shaft 6 and the second support shaft 7, respectively, in directions opposite to each other, and, with this rotation of the eject lever 3, the push rod 5 moves forward.

Further, when the push rod 5 is depressed with the IC card 1 inserted in the connector, the eject lever 3 is driven by this push rod 5 to rotate clockwise as seen in FIG. 7; since this torque is transmitted to the drive lever 4 through the engagement step portions 3b and 4b, the drive lever 4 rotates counterclockwise as seen in FIG. 7. As a result, the claw portions 3a and 4a of the eject lever 3 and the drive lever 4 push in the end portions of the card inserting/extracting surface 1a of the IC card 1, and, as shown in FIG. 8, the IC card 1 is separated from the pin contacts and pushed out to the discharge position, so that the card can be easily extracted by the fingers.

In the above-described conventional IC card connector, the eject lever 3, which rotates around the first support shaft 6, and the drive lever 4, which rotates around the second support shaft 7, are rotatably joined together by means of the engagement step portions 3b and 4b, so that the amount the drive lever 4 rotates with respect to the amount the push rod 5 is pushed in is determined by the distance between the second support shaft 7 and the engagement step portions 3b and 4b. Thus, when the distance between the second support shaft 7 and the engagement step portions 3b and 4b is set to be long, the moment of the drive lever 4 increases, so that the IC card 1 can be reliably separated from the pin contacts even if the push rod 5 is pushed in with a slight operating force. On the other hand, the rotation angle of the drive lever 4 decreases, so that the IC card 1 cannot be pushed out to a sufficient degree. In this way, a reduction in the operating force applied to the push rod 5 is not compatible with an increase in the amount the IC card is discharged. Under the circumstances, in setting the distance between the second support shaft 7 and the engagement step portions 3b and 4b, the amount the IC card is discharged takes priority over reduction in the operating force applied to the push rod 5, so that the amount the IC card is discharged cannot be increased with a slight operating force.

SUMMARY OF THE INVENTION

In accordance with the present invention, when transmitting the torque of the eject lever, which rotates upon the depressing of the push rod, to the drive lever, power transmission is effected through the intermediation of the engagement portion which is farther from the rotation fulcrum of the drive lever in the initial stage of the rotation, and power transmission is effected through the intermediation of the engagement portion which is nearer to the rotation fulcrum of the drive lever halfway through the rotation. Due to this arrangement, at the early stage of the push rod pushing-in operation, a large moment is generated though the displacement of the drive lever is small, so that, in spite of a slight operating force, the IC card can be reliably separated from the pin contacts; after the separation of the IC card, the drive lever is displaced to a large extent with respect to the amount the push rod is pushed in, so that it is possible to increase the amount the IC card is discharged and easily extract it.

In accordance with the present invention, there is provided an IC card connector comprising: a pin housing provided with a number of pin contacts connected to socket contacts of an IC card, a push rod which is supported so as to be capable of reciprocating by a frame integrally formed with the pin housing and which is depressed when extracting the IC card, an eject lever which is supported by the pin housing so as to be rotatable around a first support shaft and one end of which is engaged with the push rod, and a drive lever which is supported by the pin housing so as to be rotatable around a second support shaft, wherein formed on said drive lever are two engagement portions which are at different distances from said second support shaft, and wherein, when pushing out said IC card in an inserted state to a discharge position, a torque of said eject lever adapted to rotate upon the depressing of the push rod is transmitted to said drive lever through that engagement portion which is farther from said second support shaft and then transmitted to said drive lever through that engagement portion which is nearer to said second suport shaft.

Further, there is provided a construction wherein a second drive lever having en engagement portion through which it is engaged with said eject lever is rotatably supported by said first support shaft, and wherein the distance between said first support shaft and the engagement portion of this second drive lever is set to be substantially the same as the distance between said second support shaft and that engagement portion of the drive lever which is farther from said second shaft, whereby, when effecting the separation of the IC card, which requires a great force, it is possible to push it out substantially straightly in the IC card separating direction by the two drive levers, thereby realizing a more reliable separating operation.

DESCRIPTION OF THE PREFERRED EMBODIMENTS

Figure 1:
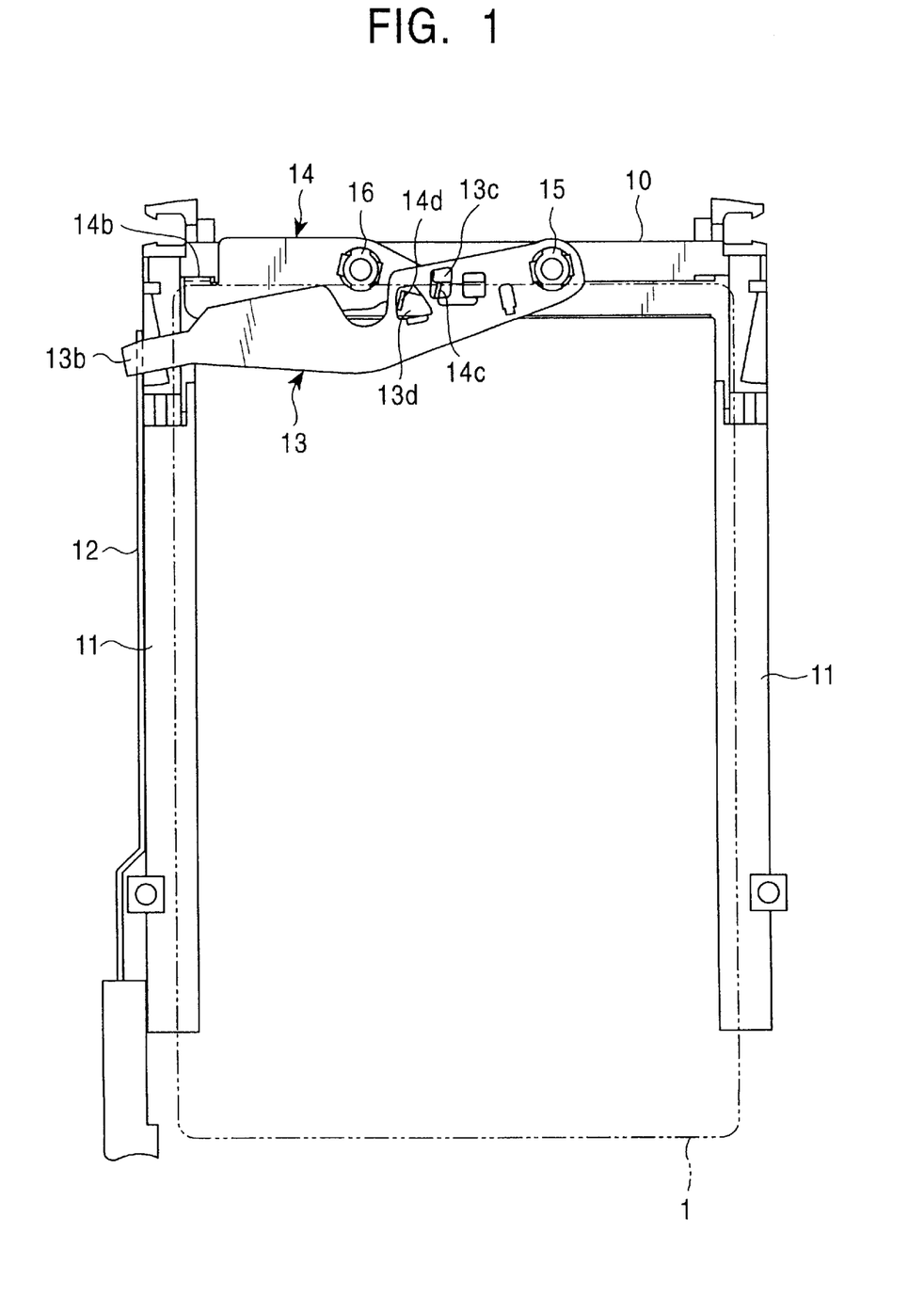
FIG. 1 is a bottom view of an IC card connector according to the first embodiment of the present invention with an IC card inserted therein.
Figure 2:
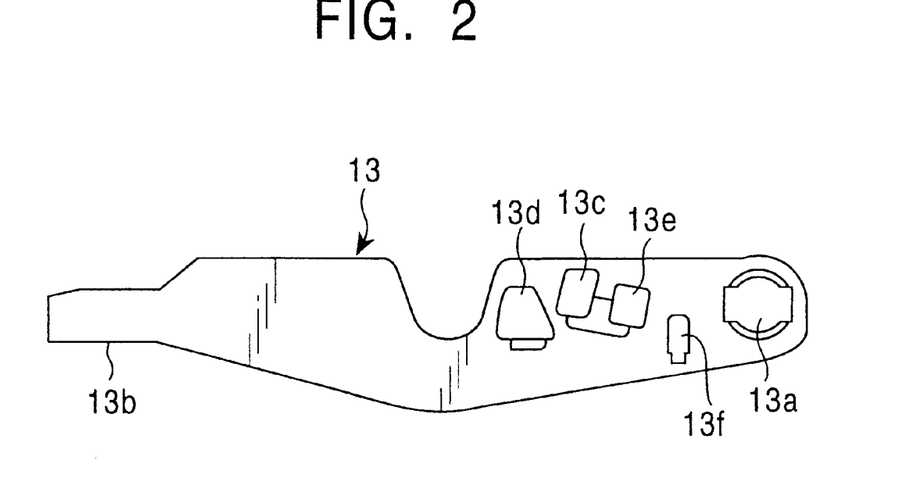
FIG. 2 is a bottom view of an eject lever.
Figure 3:
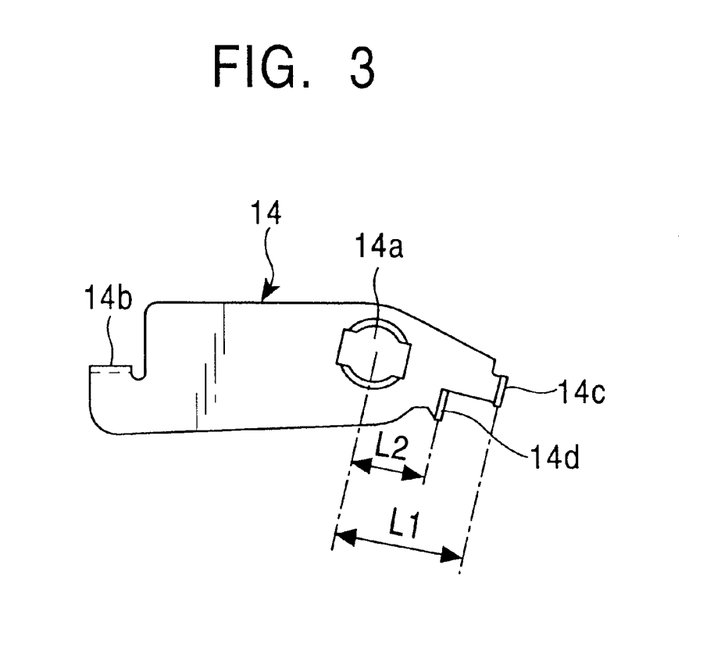
FIG. 3 is a bottom view of a drive lever.
Figure 4A:
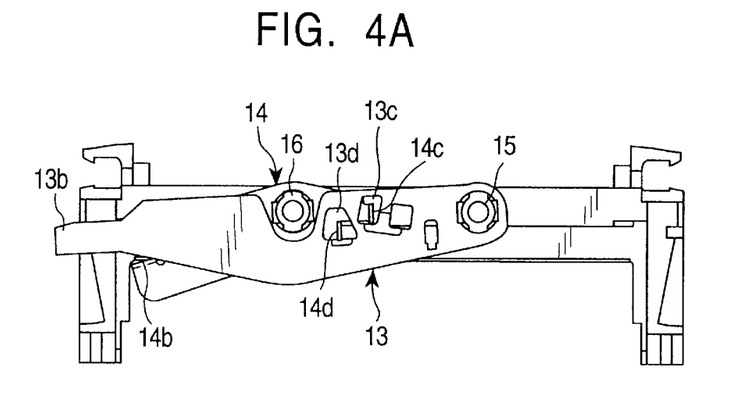
FIGS. 4A and 4B are bottom views illustrating the ejecting operation of the IC card connector shown in FIG. 1.
Figure 4B:
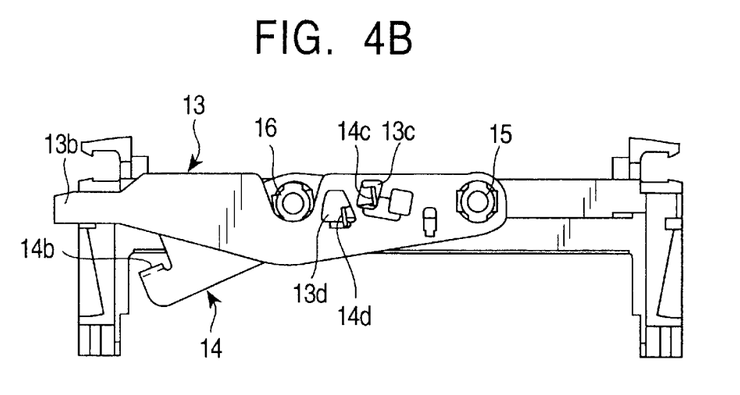
Figure 5:
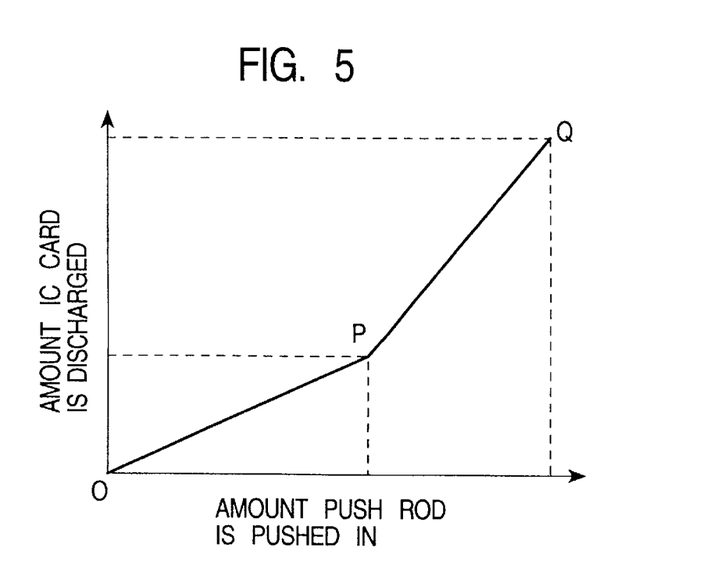
FIG. 5 is a diagram illustrating the relationship between the amount the push rod is pushed in and the amount the IC card is discharged.

Embodiments will be described with reference to the drawings. FIG. 1 is a bottom view of an IC card connector according to a first embodiment of the present invention with an IC card inserted therein; FIG. 2 is a bottom view of an eject lever; FIG. 3 is a bottom view of a drive lever; FIGS. 4A and 4B are bottom views showing the eject operation of the IC card connector shown in FIG. 1; and FIG. 5 is a diagram illustrating the relationship between the amount the push rod is pushed in and the amount the IC card is discharged.

As shown in FIG. 1, an IC card connector according to this embodiment mainly comprises a pin housing 10 in which a large number of pin contacts (not shown) to be connected to socket contacts in the IC card 1 are fitted and fastened in a predetermined arrangement, a pair of frames 11 secured to the right and left sides of the pin housing 10 and adapted to guide the IC card 1 widthwise on either side, a push rod 12 mounted to one frame 11, an eject lever 13 and a drive lever 14 driven by this push rod 12, etc. The eject lever 13 and the drive lever 14 are formed by stamping metal plates. The construction of the eject mechanism section of this IC card connector will be described in detail. The push rod 12, which is depressed when extracting the IC card 1, is held so as to be capable of being reciprocating in the IC card inserting/extracting directions by a guide protrusion (not shown) provided on the side surface of one frame 11. The eject lever 13 is rotatably supported by a first support shaft 15 protruding from the pin housing 10, and the drive lever 14 is rotatably supported by a second support shaft 16 also protruding from the pin housing 10.

As shown in FIG. 2, the eject lever 12 has a round hole 13a into which the first support shaft 15, which is the rotating shaft thereof, is inserted, an engagement portion 13b protruding from that end of the lever which is on the opposite side of the round hole 13a, and a plurality of joint holes 13c through 13f situated between the round hole 13a and the engagement portion 13b, the engagement portion 13b being engaged with the forward end portion of the push rod 12.

As shown in FIG. 3, the drive lever 14 has a round hole 14a into which the second support shaft 16, which is the rotating shaft thereof, is inserted, a claw portion 14b for pushing out the IC card 1, and first and second engagement members 14c and 14d respectively protruding into the joint holes 13c and 13d of the eject lever 13, the claw portion 14b and the engagement members 14c and 14d being bent substantially at right angles in opposite directions with respect to the plate surface of the drive lever 14. Assuming that the distance between the center of the round hole 14a and the first engagement member 14c is L1 and that the distance between the center of the round hole 14a and the second engagement member 14d is L2, L1 is sufficiently longer than L2.

In this IC card connector, constructed as described above, as the IC card 1 is inserted from the card inserting portion of the frame 11, the IC card 1 moving toward the pin housing 10 causes the pin contacts of the pin housing 10 to be forced into the socket contacts thereof while it pushes in the claw portion 14b of the drive lever 14, so that, by inserting the IC card 1 a predetermined amount, the insertion-complete state is attained, in which, as shown in FIG. 1, the IC card 1 is reliably connected to the pin contacts. At this time, the drive lever 14 rotates around the second support shaft 16, and this rotation of the drive lever 14 is transmitted to the eject lever 13 through the joint sections of the engagement members 14c and 14d and the joint holes 13c and 13d, so that the eject lever 13 rotates around the first support shaft 15 and, with this rotation, the push rod 12 moves forward along the frame 11.

On the other hand, when the push rod 12 is depressed, with the IC card 1 being thus inserted in the connector 1, the eject lever 13 rotates clockwise as seen in FIG. 1 around the first support shaft 15, and, with this rotation of the eject lever 13, the drive lever 14 rotates counterclockwise as seen in FIG. 1 around the second support shaft 16, so that the claw portion 14b of the drive lever 14 pushes in the front surface of the IC card 1, and the IC card 1 is separated from the pin contacts and pushed out to the discharge position. In this case, first, in the initial stage of the rotation of the eject lever 13, the peripheral edge of the joint hole 13c of the eject lever 13 abuts the first engagement member 14c of the drive lever 14, and the drive lever 14 rotates using the first engagement member 14c, which is farther from the rotation shaft, as the application point. Then, as shown in FIG. 4B, the peripheral edge of the joint hole 13c is separated from the first engagement member 14c. Instead, the peripheral edge of the joint hole 13d abuts the second engagement member 14d, so that the drive lever 14 rotates using the second engagement member 14d, which is nearer to the rotation shaft, as the application point.

That is, while in the initial stage of the operation of pushing in the push rod 12, a great force is required to separate the IC card 1 from the pin contacts, by rotating the drive lever 14 using the first engagement member 14c, which is farther from the rotation fulcrum, as the application point within the range between points O and P of FIG. 5, a great moment is generated, whereby the IC card 1 can be reliably separated from the pin contacts. When the IC card 1 has been separated from the pin contacts, it can be pushed out with a slight force, so that, by rotating the drive lever 14 by using the second engagement member 14d, which is closer to the rotation fulcrum, as the application point, the displacement thereof is increased, whereby the requisite amount the IC card is discharged can be secured.

Figure 6A:
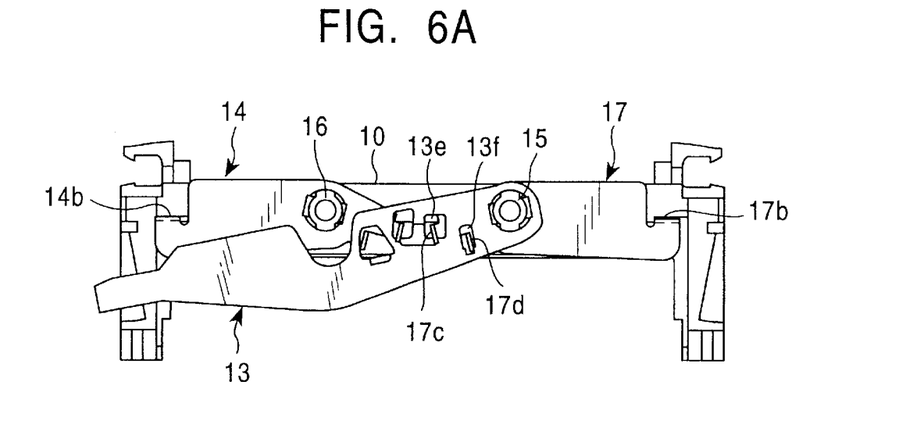
FIGS. 6A through 6C are bottom views showing the main part of an IC card connector according to the second embodiment of the present invention.
Figure 6B:
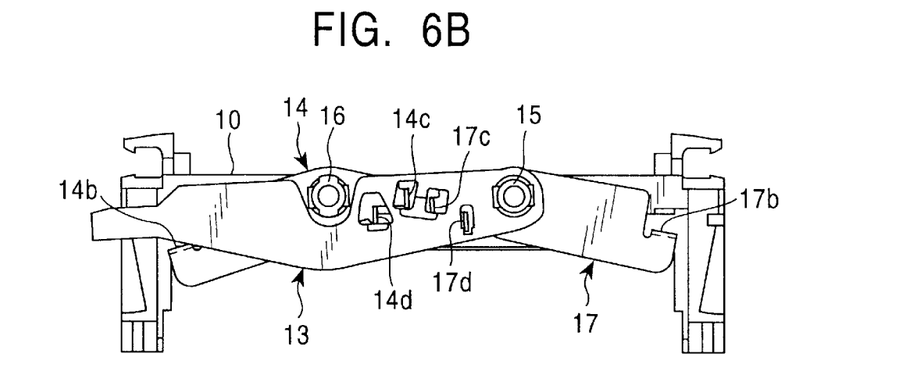
Figure 6C:
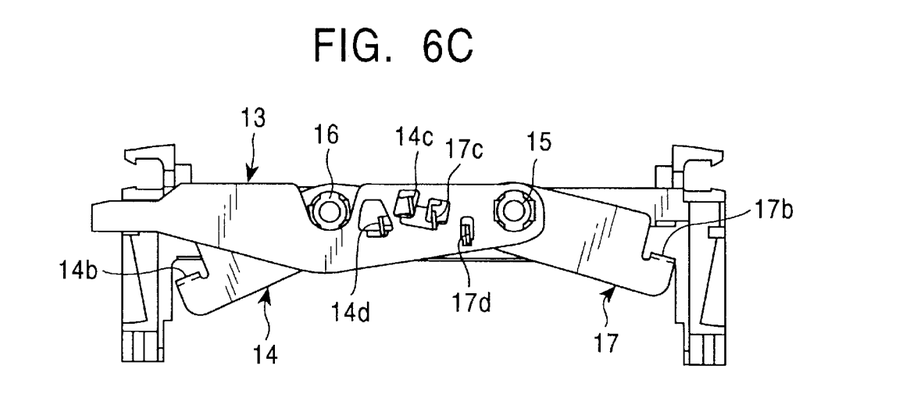

FIGS. 6A through 6C are bottom views showing the main part of the IC card connector according to a second embodiment of the present invention. The component corresponding to those of FIGS. 1 through 5 are indicated by the same reference numerals. This embodiment differs from the above-described first embodiment in that a drive lever 17 (hereinafter referred to as the second drive lever) which is separate from the drive lever 14, which is rotatably supported by the second support shaft 16, is rotatably supported by the first support shaft 15, the IC card 1 being discharged by these first and second drive levers 14 and 17. Otherwise, the construction of this embodiment is the same as that of the first embodiment.

The second drive lever 17 has a configuration such as can be obtained by reversing the first drive lever 14 by 180° and includes a claw portion 17b for pushing out the IC card 1 and first and second engagement members 17c and 17d. The distances L1 and L2 from the center of the first support shaft 15 to the first and second engagement members 17c and 17d are the same as those of the first drive lever 14, and L1 is set to be sufficiently longer than L2. The first support shaft 15 is first inserted into the second drive lever 17 and then into the eject lever 13. The first and second engagement members 17c and 17d of the second drive lever 17 protrude from the joint holes 13e and 13f, respectively. However, since the eject lever 13 and the second drive lever 17 share the first support shaft 15 as a common rotation shaft, the engagement members 17c and 17d are always engaged with the corresponding joint holes 13e and 13f irrespective of the rotation angle of the eject lever 13.

When, in this IC card connector, constructed as described above, the push rod 12 is depressed, with the IC card 1 being inserted in the connector 1, as shown in FIG. 6A, the eject lever 13 rotates around the first support shaft 15 as a result of the depressing of the push rod 12, and, with the rotation of the eject lever 13, the first drive lever 14 is operated in the same manner as in the first embodiment described above. Further, in the initial stage of the rotation of the eject lever 13, the rotation of the eject lever 13 is transmitted to the second drive lever 17 through the abutment portions of the joint holes 13e and 13f and the engagement members 17c and 17d, as shown in FIG. 6B, so that the second drive lever 17 rotates around the first support shaft 15 in reverse direction to the first drive lever 14, and the respective claw portions 14b and 17b of the first and second drive levers 14 and 17 push in the front surface of the IC card 1 in the separating direction. In this case, the distances between the rotation centers of the drive levers 14 and 17 and the first engagement members 14c and 17c are set to be the same, so that the claw portions 14b and 17b of the drive levers 14 and 17 push in the end portions of the front surface of the IC card 1 with the same force, with the result that the IC card 1 is pushed out substantially straightly in the separating direction, thereby realizing a reliable separating operation.

When the eject lever 13 further rotates, the first drive lever 14 rotates using the second engagement member 14d, which is nearer to the rotation fulcrum, as the application point, as shown in FIG. 6C, and greatly pushes out the IC card 1 to the discharge position. However, since the application point of the second drive lever 17 does not change, the displacement of the second drive lever 17 is smaller than that of the first drive lever 14, and the claw portion 17b of the second drive lever 17 ceases to be involved in the operation of discharging the IC card 1. However, as described above, once the IC card 1 has been separated from the pin contacts, it can be pushed out with a slight force, so that, during this period, the IC card 1 can be pushed out by the claw portion 14b of the first drive lever 14 alone without any problems.

While in the above-described embodiments the pin housing 10 and the pair of frames 11, which are separate members, are formed into an integral unit in the post process, it is naturally also possible to form the pin housing 10 and the frames 11 as an integral unit by molding in advance.

The present invention, which is carried out as described above, provides the following advantages.

Due to the structure which comprises a pin housing provided with a large number of pin contacts connected to socket contacts of an IC card, a push rod which is supported so as to be capable of reciprocating by a frame integrally formed with the pin housing and which is depressed when extracting the IC card, an eject lever which is supported by the pin housing so as to be rotatable around a first support shaft and one end of which is engaged with the push rod, and a drive lever which is supported by the pin housing so as to be rotatable around a second support shaft and which has a claw portion for pushing out the IC card, wherein formed on the drive lever are two engagement portions which are at different distances from the second support shaft, and wherein, when pushing out the IC card in an inserted state to a discharge position, a torque of the eject lever adapted to rotate upon the depressing of the push rod is transmitted to the drive lever through that engagement portion which is farther from the second support shaft and then transmitted to the drive lever through that engagement portion which is nearer to the second support shaft, whereby a large moment is generated in the initial stage of the operation of pushing in the push rod though the displacement of the drive lever is small, so that the IC card can be reliably separated from the pin contacts with a slight operating force; after the separation of the IC card, the drive lever is greatly displaced with respect to the amount the push rod is pushed in, so that the amount the IC card is discharged is increased to thereby make it possible for the IC card to be easily extracted.

Further, an arrangement is adopted wherein a second drive lever having en engagement portion through which it is engaged with the eject lever is rotatably supported by the first support shaft and wherein the distance between the first support shaft and the engagement portion of this. second drive lever is set to be substantially the same as the distance between the second support shaft and that engagement portion of the above-mentioned drive lever which is farther from the second support shaft, whereby, when effecting the operation of separating the IC card, which requires a great force, it is possible to push out the IC card substantially straightly in the separating direction by the two drive levers, thereby realizing a more reliable separating operation.

What is claimed is:

1. An IC card connector comprising: a pin housing provided with a large number of pin contacts connected to socket contacts of an IC card, a push rod which is supported so as to be capable of reciprocating by a frame integrally formed with the pin housing and which is depressed when extracting the IC card, an eject lever which is supported by the pin housing so as to be rotatable around a first support shaft and one end of which is engaged with the push rod, and a drive lever which is supported by the pin housing so as to be rotatable around a second support shaft, wherein formed on said drive lever are two engagement portions which are engaged with said eject lever, and the distance from said second support shaft to each of said engagement portions is set to be different, and wherein, when pushing out said IC card from an inserted state to a discharge position, a torque of said eject lever adapted to rotate upon the depressing of the push rod is transmitted to said drive lever through the engagement portion which is farther from said second support shaft and is then transmitted to said drive lever through that engagement portion which is nearer to said second support shaft.

2. An IC card connector according to claim 1, comprising two drive levers, wherein the second drive lever having an engagement portion through which it is engaged with said eject lever is rotatably supported by said first support shaft, and wherein the distance between said first support shaft in said second drive lever and the engagement portion of said second drive lever is set to be substantially the same as the distance between said second support shaft in the first drive lever and the engagement portion of said first drive lever which is farther from said second shaft.

* * * * *